March 10, 1970  W. D. MAY  3,500,179
SYSTEM FOR DISPLAYING OUT-OF-TRAM MEASUREMENTS IN DISC REFINERS
Filed July 17, 1967  7 Sheets-Sheet 6

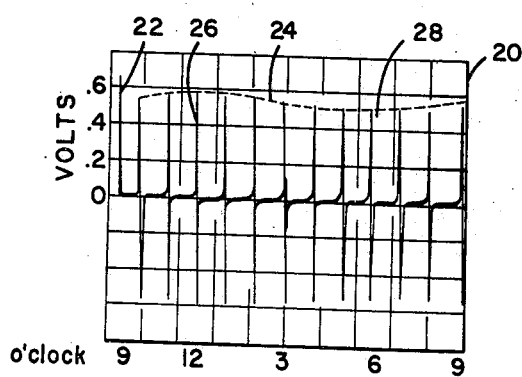
PRIOR ART FIG. 1
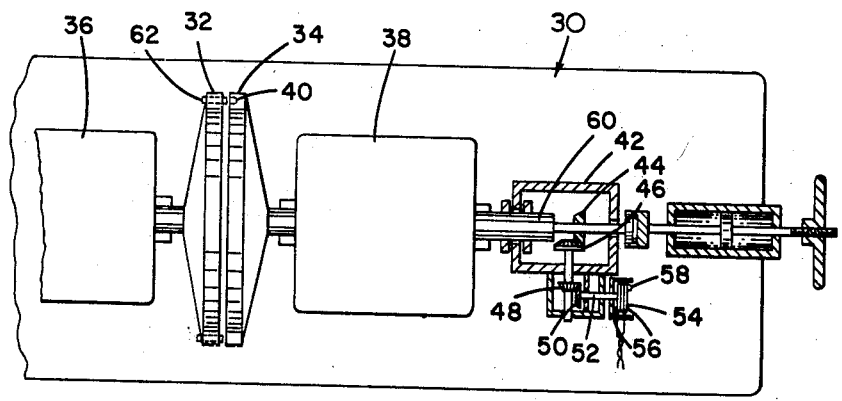
FIG. 2

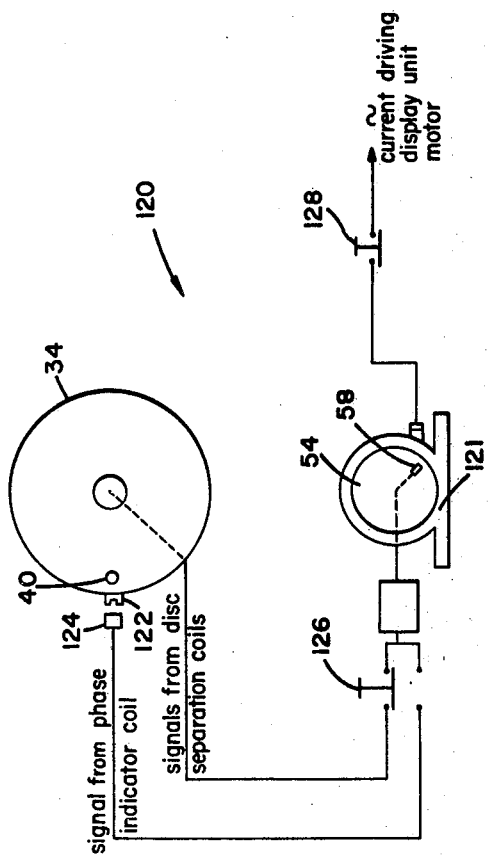

United States Patent Office 3,500,179
Patented Mar. 10, 1970

3,500,179
SYSTEM FOR DISPLAYING OUT-OF-TRAM MEASUREMENTS IN DISC REFINERS
William D. May, Hampstead, Quebec, Canada, assignor to Pulp and Paper Research Institute of Canada, Pointe Claire, Quebec, Canada, a non-profit corporation of Canada
Filed July 17, 1967, Ser. No. 653,708
Int. Cl. G01r *33/02*
U.S. Cl. 324—34                    12 Claims

ABSTRACT OF THE DISCLOSURE

A system for displaying out-of-tram (the misalignment of and distance between plates) in disc refiners which consists of a magnet mounted on one disc and a series of coils spaced round the periphery of the other disc. When the discs are rotated, the signals generated in the coils by the magnet sweeping past them vary as the local coil to magnet distance. These signals are fed to a circuit which accentuates the difference between adjacent signal values and uses the accentuated signals to light a neon lamp which rotates in synchronism with one of the discs. By using a calibrated adjustment for controlling the degree of accentuation the out-of-tram may be measured for each peripheral position as the lamp goes out, and the plane of maximum out-of-train may be seen at a glance.

---

This invention relates to an apparatus for measuring out-of-tram (misalignment of and distance between plates) in disc refiners and more particularly to an improved system for displaying the out-of-tram of the discs.

In U.S. Patent 3,434,670 issued Mar. 25, 1969 an apparatus for measuring out-of-tram and plate separation of disc refiners was disclosed. Such refiners are used to refine material such as a plup suspension or a mixture of wood chips, water and chemicals. This described as one embodiment an arrangement in which six coils are carried in one disc and a single magnet on the other. The magnitude of the signal induced in a coil as the magnet passes that coil is a measurement of the local distance separating the discs when they are rotating.

In the above mentioned apparatus separation values were obtained by an oscilloscope display. Unfortunately, the signal showing the maximum out-of-tram differs from the mean separation signal by only 1% or so and this prevents the out-of-tram being measured accurately. Commercial oscilloscopes are expensive, required complex adjustments, and are, therefore, unsuitable for the simple requirements of a refiner operator. Moreover, the oscilloscope requires the operator to compare all the signals to determine the position of maximum out-of-tram.

It is an object of this invention to enable the position of maximum out-of-tram to be seen at a glance; it is another object to enable the out-of-tram value to be measured easily, simply and accurately and with inexpensive equipment.

I have found that this may be accomplished by providing a discharge lamp rotated synchronously with a refiner disc, the lamp being lit by suitably modifying the signals from coils energized by a magnet, the coils and magnet being mounted on opposite refiner discs.

Figure 3:
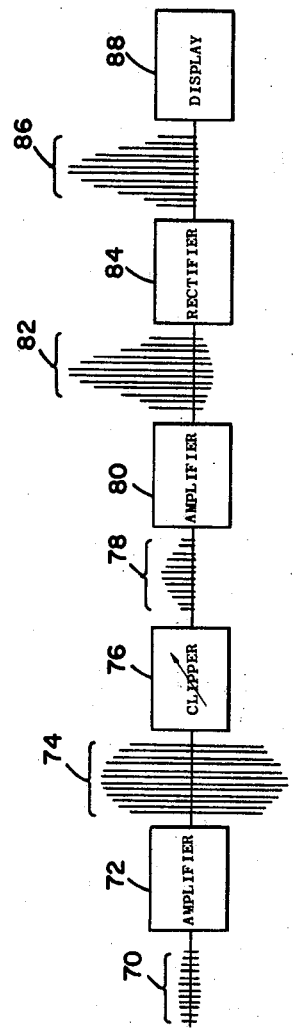
Figure 4:
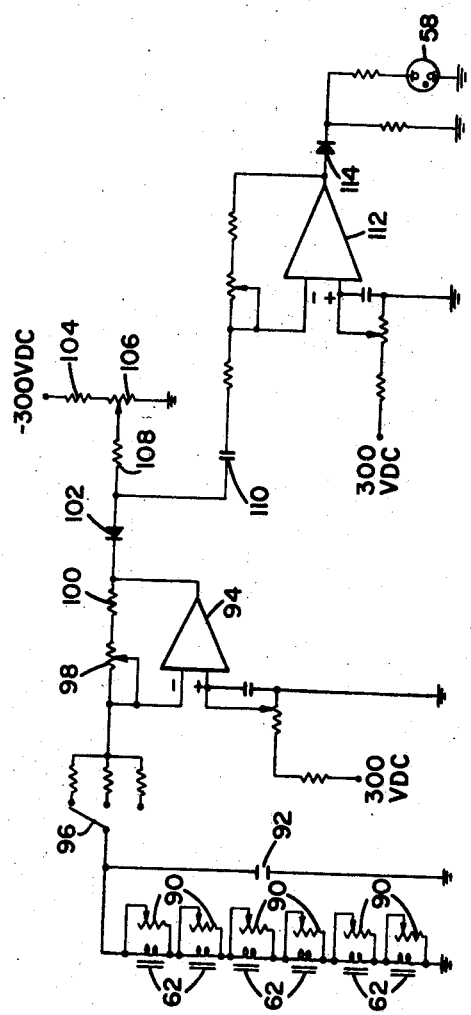
Figure 5:
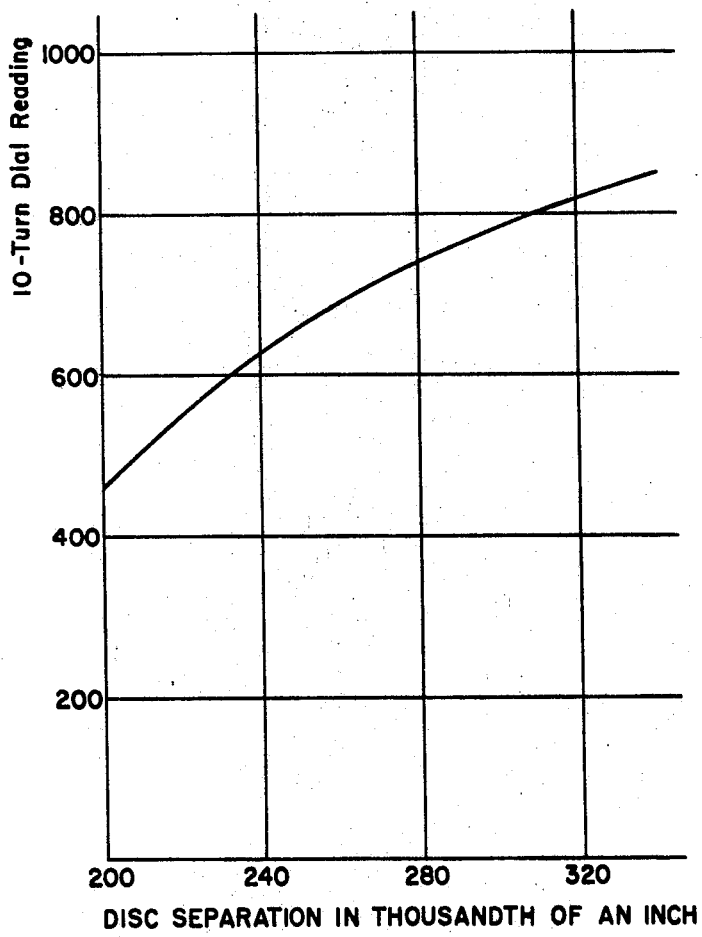

The invention may best be understood by reference to the attached drawings in which:

FIGURE 1 illustrates a typical prior art display,
FIGURE 2 shows one mechanical coupling drive arrangement for the display of the present invention,
FIGURE 3 shows a typical schematic block diagram for processing the signals from the coils to the lamp,
FIGURE 4 shows a typical circuit diagram for the display,
FIGURE 5 shows a typical calibration curve,
FIGURES 6a, 6b, 6c and 6d illustrate the display shown by the apparatus of the present invention in successive stages of adjustment,
FIGURE 7 illustrates diagrammatically the synchronizing arrangement for an electrically coupled drive for the display.

FIGURE 1 illustrates the difficulties in measuring the out-of-tram with the prior art system, the display being generally indicated by 20. The coils are connected in series with the input of a standard oscilloscope. The pattern repeats itself for each revolution of the refiner by a triggering pulse illustrated at 22 initiating the oscilloscope sweep. This is generated by attaching an additional magnet to one of the discs and a coil to the refiner frame. Out-of-tram will be indicated by the difference in magnitude of signals giving a sinusoidal envelope 24. The refiner discs are closest at signal 26 and furtherest apart at signal 28 and the difference between these gives the out-of-tram and the means height gives the average plate separation. The figure show the signals from an exaggerated out-of-tram condition; this was done to show clearly the difference in magnitude of the signals. Usually this difference is only of the order of 1% or less of the mean signal, as stated above.

FIGURE 2 shows a cross-sectional view through a typical drive arrangement shown generally at 30. It will be understood that the details of the drive are not a limitation upon the invention, and other mechanical drives, or even an electrical drive properly synchronized, may be used; one such electrical drive is described further below.

The arrangement shows a refiner with opposed discs 32, 34 driven by induction motors 36, 38. As is well known the rotational speed of induction motors changes under load, but this factor is unimportant for the direct mechanical drive arrangement shown. The magnet 40 is shown fitted to the control side disc 34, that is the one which is axially moveable by hydraulic pressure to set the clearance between the two discs. Unfortunately, the end of the shaft is not accessible due to the hydraulic mechanism and therefore transmission arrangement 42 has been inserted from which the drive to the display unit is taken. This arrangement however has the advantage that the display unit is at the control end of the refiner. As shown two pairs of bevel gears 44, 46 and 48, 50 drive a shaft 52 on which is mounted a disc 54 incorporating two slip rings 56 and a neon or similar type of discharge lamp 58 it being understood that the gear ratios are chosen so as to drive the display shaft 52 at exactly the same speed as the refiner disc shaft 60. The rotational position of the lamp 58 is arranged to correspond with that of the magnet 40 and the lamp is connected to the two slip rings 56 which are fed by suitably modified signals, described below, from the coils mounted on the axially fixed or non-control side refiner disc 32. The slip ring arrangement for obtaining the output from the coils has already been described in my aforementioned U.S. Patent 3,434,670. It is to be understood that this present invention is also applicable to the multiple magnet and single coil system mentioned in that patent.

Each time a signal generated in a coil reaches a sufficient value, the neon lamp flashes and a number of points of light will be produced on the periphery of the circle swept out by the lamp corresponding to the position at which a coil and the magnet cross. This is illustrated on FIGURE 6a.

A typical circuit for achieving measurement of the outof-tram and enabling the display to show the maximum out-of-tram position is illustrated in block form in FIGURE 3 and the details are given in FIGURE 4. However, other circuits are possible provided they accentuate the differences between successive signals. Another variation would be one in which larger signals trigger a source which lights the lamp and smaller signals fail to do so. What is important is that the voltages which light the lamp and fail to light it, must differ by more than 8 volts for a neon lamp since otherwise accurate measurement may be masked by ambient temperature, sunlight and other factors which affect the striking voltage.

In FIGURE 3, the vertical lines represent diagrammatically the values of the signals corresponding to the voltages generated by coils (62 on FIGURE 2) and the blocks represent the operations performed. The unmodified coil voltages as taken from the coil slip rings are shown at 70; these are then amplified by amplifier 72 producing modified voltages 74. These are then fed to a clipper which is adjustable for reasons to be explained below. The clipped signals 78 are fed to second amplifier 80 and are then rectified by rectifier 84. These signals are fed through the slip rings (56 on FIGURE 2) to the neon lamp 58, these last being indicated by the block 88 labelled "Display."

The apparent brightness of each point varies with the strength of the signal coming from the coil represented by that point. The function of the clipper is to remove the large standing part of the signal leaving only the amplified difference between the signals to trigger the neon lamp.

Figure 6A:
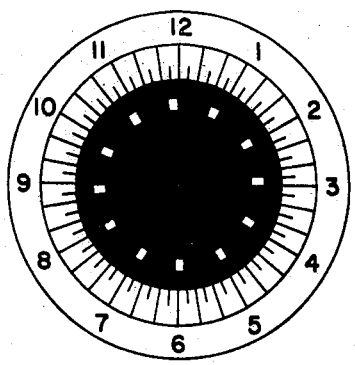
Figure 6B:
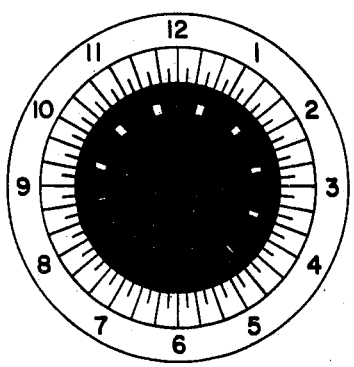
Figure 6C:
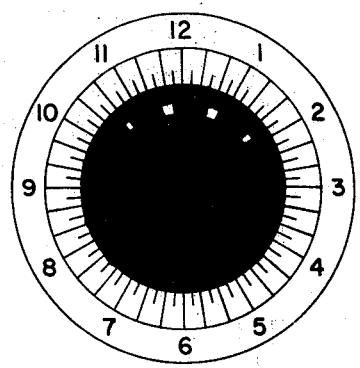
Figure 6D:
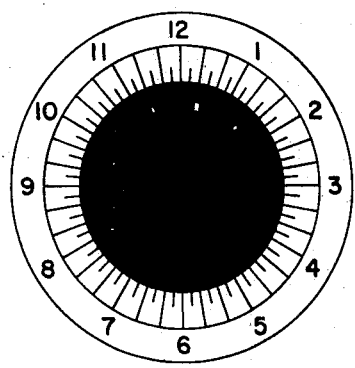

The clipper device is operated to decrease the voltage of the signals until a point is reached when the weakest signal is less than the striking voltage of the neon lamp (about 70 volts) which no longer lights in the position corresponding to the coil which generates this voltage. The blank spot then indicates the position of the maximum out-of-tram as shown in FIGURE 6b. Further operation of the clipper leads to progressive extinguishing of the lamp on both sides, the last lit position of the lamp indicating the position at which the discs are closest together. The plane of maximum out-of-tram is thus readily seen at a glance.

The clipper adjustment to extinguish the lamp at a given position is, therefore, a function of the disc separation at that position. This adjustment can be made by a potentiometer whose dial is calibrated in terms of disc separation. By noting the potentiometer dial reading as the lamp at each position fails to be lit, the plate separation at the twelve points can be determined. These readings will give both the amount of out-of-tram and average plate clearance. A typical calibration curve is illustrated in FIGURE 5.

FIGURE 4 shows the practical details of the circuit. The coils 62 are individually trimmed by variable resistors 90 to compensate for individual differences and are connected in series. The output is connected across a capacitor 92, suitably 0.5 microfarad, to an amplifier 94 which may conveniently be a Philbrick K2–XA operational amplifier and whose gain may be controlled by a gain selector switch 96.

The clipper circuit consists of a diode 102 which may conveniently be a T1459 or similar type operated under reverse bias, the voltage of which is controlled by a divider network consisting of a resistor 104 and a potentiometer 106. It is this potentiometer which is calibrated (after the gain of amplifier 94 has been fixed at some suitable value) to read in terms of disc separation. A resistor 108 prevents undue variation of the load on amplifier 94 when the clipping level is changed.

The output from the clipper circuit is fed through a blocking capacitor 110 to an amplifier 112 operating under similar conditions to the first amplifier 94. The output of amplifier 112 is fed through a rectifying diode 114 which may also be a T1459 or similar type. This removes the amplified undershoot from the clipper diode 102, and the signal then passes by way of brushes and the slip rings, not shown on FIGURE 4, but on FIGURE 2 as 56 to the neon lamp 58 which may be a NE76 or similar type.

FIGURES 5, 6a, 6c, 6b and 6d have been explained in the course of describing the invention and how it works.

FIGURE 7 illustrates diagrammatically a drive arrangement as an alternative to FIGURE 2. This embodiment of the invention is particularly suitable where disc refiners are driven by synchronous motors, which as is well known rotate at a fixed speed independent of load. This makes it possible to drive the display unit by a small synchronous motor running at the same speed and powered by the same supply as the refiner without any mechanical coupling. However, stopping and starting the refiner motors may result in their becoming out of step with the display unit motor. This is corrected by providing a phase matching device shown generally at 120 using a hysteresis type synchronous motor 121 and a phase indicating device. This phase indicating device consists of an additional phase indicator magnet 122 attached to the periphery of a refiner disc 34 alongside the disc separation magnet 40, and a phase indicating coil 124 mounted on the stationary frame of the refiner. The sensing coils are temporarily disconnected by push-button switch 126; if the lamp 58 which now flashes once per revolution of the display disc 54 lights up in a different position from that of the phase indicating coil, the display unit and the refiner are out of phase. Push-button switch 128 is then pressed momentarily disconnecting the display unit motor 121 from its power source and the motor will slow down until the lamp flashes in the position corresponding to the position of the phase indicator coil 124 (and the disc separation magnet 40). Push-button switch 128 is released and then push-button 126 is also released and measurement of out-of-tram can then be carried out as described above.

It will be obvious that many alternative drive arrangements are possible. For example, a mechanical variation would be to mount a spur gear on shaft 60 in FIGURE 2 and a flexible shaft used to drive the display unit. Alternatively, the sensing coils 62 and magnet 40 may be interchanged so that the magnet is mounted on the non-control side disc 32 and the display unit mounted on the end of the motor shaft driving that disc. Similarly, other electrical drive arrangements are possible. It will also be understood that if both discs rotate at somewhat different speeds in opposite directions a single coil and a single magnet may suffice; when the signal is sufficient to light the lamp at all values of plate separation, the lighted position will appear to travel slowly round the circle. In a single disc refiner, in which only one disc rotates, a plurality of either coil or magnets is required to show the out-of-tram and the single item, be it coil or magnet must rotate and drive the lamp in synchronism.

If the coil or coils rotate, it is possible to drive the lamp directly from the shaft of the disc on which the coil or coils are mounted; this could eliminate the two sets of slip rings for the coil to circuit and circuit to lamp embodiment described. However, attendant disadvantages to this arrangement are that the circuit elements will rotate and the adjustments for clipping level and amplification or the equivalent in other arrangements and the power for operating the circuits will still require slip ring feeds. An orientation signal will also be required.

I claim:
1. In a disc refiner having two discs at least one of which is rotatable,
a means for measuring out-of-tram and plate separation comprising:
at least one coil mounted on one of said discs,
at least one magnet mounted on the other of said discs, said coil and said magnet being arranged so that upon relative rotation of the discs electrical signals are produced in said coil, the value of the signals being dependent upon the spacing between said coil and said magnet, means for accentuating the differences between successive signals produced by the coil so as to produce some signals of sufficient voltage to light a discharge lamp, a discharge lamp, said discharge lamp connected to the output of said means for accentuating the differences between successive signals, and drive means to rotate said discharge lamp in a circle in phase and synchronism with a rotatable disc.

2. A means for measuring out-of-tram and plate separation as claimed in claim 1 in which said means for accentuating the differences between successive signals comprises an amplifying means and a clipping means.

3. A means as claimed in claim 2 in which said clipping means has adjustment means and is calibrated to give a reading of plate separation.

4. In a disc refiner having at least one coil mounted on a first disc, and at least one magnet mounted on a second disc the coil and magnet being arranged so that upon relative rotation of the discs electrical signals are produced in the coil, the signals being a function of the spacing between the coil and magnet, the improvement comprising:
 a discharge lamp,
 a means for rotating said discharge lamp in phase and synchronism with one of the discs, and
 a means connected to said discharge lamp and the coil, and arranged to accentuate the differences between successive electrical signals produced by the coil and being further arranged to light said discharge lamp when the electrical signals exceed a predetermined value.

5. In a disc refiner, the improvement as claimed in claim 4 in which said accentuating and lighting means includes an amplifying circuit for said electrical signals and a clipping circuit to accentuate the differences between said signals.

6. The improvement as claimed in claim 5 in which said clipping means has adjustment means and is calibrated to give a reading of plate separation.

7. A disc refiner comprising:
 a first disc and a second disc, at least one of which is rotatable relative to the frame of the refiner,
 a plurality of coils connected in series and spaced round the periphery of said first disc, at least one magnet mounted on said second disc, said coils and said magnet being arranged so that upon relative rotation of said first and said second discs electrical signals are produced in said coils, the strength of the signals being dependent upon the spacing between said coils and said magnet,
 a discharge lamp,
 means to rotate said discharge lamp in phase and synchronism with one of said discs,
 and an amplifying means and clipping means connected between said coils and said discharge lamp to accentuate the differences between the strength of the signals from each of said plurality of coils.

8. A disc refiner as claimed in claim 7 in which said drive means to rotate said discharge lamp consists of a mechanical transmission driven by the second disc.

9. A disc refiner as claimed in claim 7 in which said means to rotate said discharge lamp is an electric motor driven at the same speed as said second disc and which incorporates in addition,
 a phase orientation means to orient the rotational position of the discharge lamp to correspond with the rotational position of said magnet.

10. A disc refiner as claimed in claim 7, including a parallel rheostat to electrically balance each coil and to produce uniform output signals for uniform distances between each of said coils and said magnet.

11. A disc refiner as claimed in claim 7 including means to mount said first disc rotatable relative to the frame of the refiner and said means to rotate said discharge lamp comprises a mounting for said discharge lamp on the shaft driving said first disc.

12. A disc refiner as claimed in claim 11 including a parallel rheostat to electrically balance each coil and to produce uniform output signals for uniform distances between each of said coils and said magnet.

References Cited

UNITED STATES PATENTS

| | | | |
|---|---|---|---|
| 1,804,168 | 5/1931 | Keller | 73—462 XR |
| 3,048,041 | 8/1962 | Trimble | 73—462 |
| 3,411,074 | 11/1968 | Mayer | 324—34 |

ALFRED E. SMITH, Primary Examiner

U.S. Cl. X.R.

73—462; 241—37